United States Patent Office 3,480,791
Patented Nov. 25, 1969

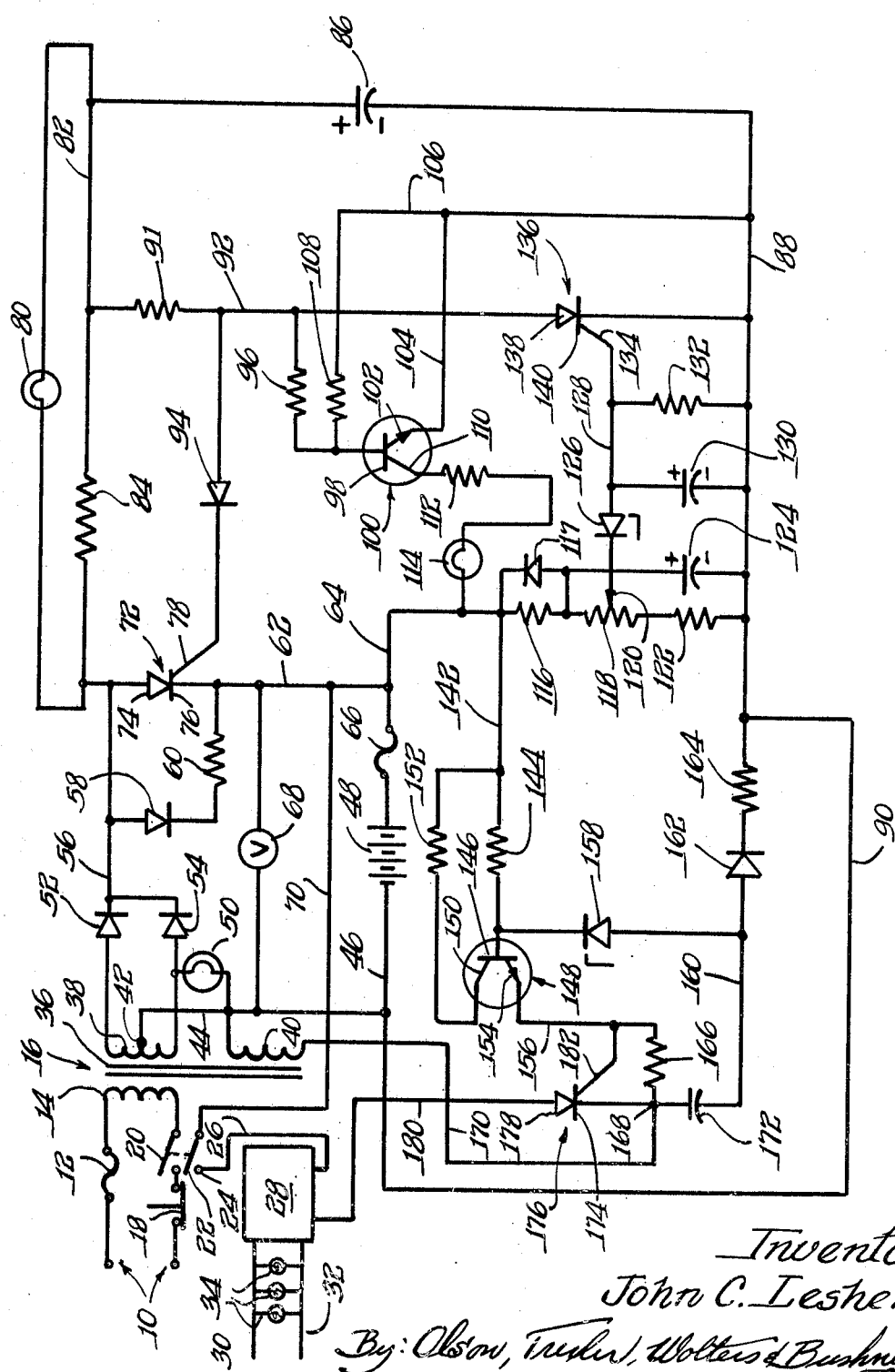

3,480,791
EMERGENCY LIGHTING SYSTEM WITH TWO
RATE BATTERY CHARGER
John C. Lesher, Erie, Pa., assignor to Penn-Western
Electric, Erie, Pa., a corporation of Pennsylvania
Filed May 26, 1967, Ser. No. 641,581
Int. Cl. H02j 7/06, 9/02
U.S. Cl. 307—66                            14 Claims

ABSTRACT OF THE DISCLOSURE

An emergency or stand-by D.C. lighting system connected to the A.C. mains, and utilizing solid state switches or controlled rectifiers for effecting a two rate battery charge, and for turning the emergency or stand-by lamps on, Zener diodes affording close control of the solid state switches or controlled rectifiers.

---

The general principles of D.C. emergency or stand-by lighting systems are well known. In such systems a storage battery is kept charged from the A.C. supply or mains, and the A.C. supply acts through suitable relay means to hold the D.C. lamps or the like out of circuit. In the event of failure of the A.C. supply, the electromagnetic relay means used in the past have been spring actuated so as to close and to connect the D.C. lamps in circuit. Such electromagnetic relay means have been power consuming, have taken up a great deal of space, and have not been satisfactorily reliable in operation.

Accordingly, it is the principal object of the present invention to provide a completely solid state emergency or stand-by D.C. lighting system.

More specifically, it is an object of this invention to provide such a system utilizing solid state switches or controlled rectifiers for providing a dual rate battery charge; i.e., high rate and low rate, and for connecting the D.C. lamps to the battery.

Other and further objects and advantages of the present invention will be apparent from the following description when taken in connection with the single figure of the accompanying drawing which comprises a schematic wiring diagram of an emergency or stand-by lighting system constructed in accordance with the present invention.

With reference now in greater particularity to the drawings, the A.C. input line or mains is indicated at 10. One side of the line is fused at 12, and is connected to one end of the primary 14 of a step-down transformer 16. The other side of the line is connected through a switch 18 and a manually operable single-throw double-pole switching comprising a movable switch arm 20 connected to the opposite end of the primary winding 14. The movable switch arm 20 is ganged for concurrent movement with a movable switch arm 22 engageable with a fixed contact 24 which is connected by a wire 26 to a terminal block 28 having output lines 30 and 32 across which the D.C. lamps 34 are connected. There may be any number of such lamps, and the three shown are simply by way of illustration.

The transformer 16 is provided with a steel core 36, and with a pair of output windings 38 and 40, the former being center-tapped at 42. The center tap is connected to a negative line 44, which in turn is connected to a line 46 having the negative side of the storage battery 48 connected thereto. Typically, the storage battery is the conventional lead-acid or nickel-cadmium battery having a nominal six volts output. An amber lamp 50 is connected between the line 44 and one end of the secondary 38 to indicate that the system is turned on. The opposite ends of the winding 38 are respectively connected to diodes 52 and 54 of a type capable of carrying the necessary current. The opposite sides of the two diodes are connected together to a line 56 and a diode 58 is connected thereto, and is poled to conduct current in the conventional sense from positive to negative away from the line 56. By way of example, this diode may be a type A13F. The other side of the diode 58 is connected to a rather low value resistor 60, for example a 22 ohm 2-watt resistor. The opposite side of the resistor 60 is connected to a positive line 62, which is in turn connected to a line 64, leading through a fuse 66 to the battery 48. The diode 58 serves as a trickle charge path, the diodes 52 and 54 with the center-tapped transformer comprising a full wave rectifier. A voltmeter 68 is connected across the lines 62 and 44 to indicate visually the condition of charge of the battery 48. A line 70 is connected from the positive line 62 to the previously mentioned movable switch contact 22 to provide a positive potential to the terminal block 28.

The line 56 is also connected to a solid state switch or controlled rectifier 72 having an anode 74, a cathode 76, and a gate 78. The cathode is connected to the previously mentioned line 62. When the solid state switch or controlled rectifier 72 conducts, it conducts direct to the battery 48 without an intermediate resistor, and thereby serves as a high rate charge path for the battery 48. Suitable biasing is provided as hereinafter described to hold the solid state switch 72 non-conductive, or to turn it on, as may be required.

The wire 56 also is connected to one side of a green indicating lamp 80, the opposite side of which is connected to a wire 82. The wire 82 is returned to wire 56 through a resistor 84. It will be apparent that when current is carried by the resistor 84, there will be a potential drop across the indicating lamp 80 which will therefore light up to indicate a low rate charge.

A capacitor 86 is connected from the wire 82 to a negative wire 88, the latter being connected through a wire 90 back to the negative wire 46 on the negative side of the battery. This capacitor charges under appropriate conditions to maintain a positive potential at the top thereof, and a negative potential at the bottom. By way of example, the capacitor 86 may be a 22 microfarad, 15 volt capacitor.

The wire 82 further is connected to a resistor 91 leading to a wire 92. The resistor 91 may be a 2-watt 15-ohm resistor. The wire is connected to the anode of a diode 94, the cathode thereof being connected to the gate 78 of the controlled rectifier or solid state switch 72. This diode also may be a type A13F, and the switch or rectifier 72 may be a type C30F.

The wire 92 is connected to a resistor 96—for example, an 820-ohm ½ watt resistor—and the other side of the resistor is connected to the gate 98 of a transistor 100—for example, a 2N3402 transistor. The emitter 102 of this transistor is connected to a line 104 which leads to a wire 106 connected to the negative line 88. In addition, a resistor 108 is connected from the base 98 to the line 106, and this resistor may be a 220 ohm, ¼ watt resistor. The collector 110 of the transistor is connected through a resistor 112—for example, a 10 ohm ½ watt resistor—to a red indicating light 114, the other side of the light or lamp 114 being connected to the line 64. This lamp is illuminated when the battery is on the high rate charge.

The wire 64 is connected to the upper end of the resistor 116 having a diode 117 connected across it, the cathode being up and the anode being down, in the position shown in the drawing. The resistor 116 may be a two ohms and one-half watt. The bottom end of the resistor 116 is connected to the top end of the resistor 118 having a sliding tap 120 thereon, the resistor being 200 ohms, and the lower end of this resistor being connected to a resistor 122 having a resistance of 470 ohms, and being a one-half watt resistor. The junction of the bottom ends of the resistor 116 and diode 117 is connected to the top or positive side of a large capacitor 124, for example 300 microfarads and 25 volts. The sliding tap 120 is connected to the cathode of a Zener diode 126, the anode thereof being connected to a line 128, this line being connected to the positive side of a power capacitor 130, for example 50 microfarads at 15 volts. The negative sides of both capacitors 124 and 130 are connected to the negative wire or line 88. The capacitor 130 is paralleled by a resistor 132, for example 1,000 ohms and ½ watt. Furthermore, the line 128 is connected to the gate 134 of a solid state switch or controlled rectifier 136, for example a type C106Y4. The anode 138 of this controlled rectifier is connected to the line 92, while the cathode 140 is connected to the negative line 88.

The line 64 has connected thereto a wire or line 142 leading to the resistor 144—for example, 1,500 ohms and ½ watt—the opposite side of the resistor 144 being connected to the base 146 of a transistor 148. The collector 150 of this transistor is connected back through a resistor 152—for example, 150 ohms, ½ watt—to the line 142. The emitter 154 is connected to a line 156. This transistor, like the transistor 100, is an n-p-n transistor, and specifically may be a type 2N2923.

The base 146 of the transistor is connected through a Zener diode 158, the cathode thereof being connected to the base, and the anode being connected to a line 160. This Zener diode may be a type X16J1977, as contrasted with the Zener diode 126, which may be a type X16L1423. The line 160 is connected to the anode of a diode 162, for example a type A13F, the cathode being connected to a resistor 164 to the lines 88 and 90, the resistor 164, for example, being 10 ohms and ½ watt.

The line 156 from the transistor emitter is connected through a resistor 166—for example 1,000 ohms, ½ watt— to a junction 168. This junction is returned through a wire 170 to one side of the secondary winding 40, the opposite side thereof being connected to the wire 44. The junction also is connected to the positive side of a capacitor 172, the opposite side being connected to the line 160, and this capacitor for example being 100 microfarads and 15 volts. The junction 168 further is connected to the cathode 174 of a controlled rectifier 176, for example a type C30F.

The anode 178 of the controlled rectifier 176 is connected to a line 180 leading to the terminal block 28, and comprising the negative side of the line, corresponding to the wire or line 32. The gate 182 of the solid state switch or controlled rectifier is connected to the line 156.

With A.C. potential supplied on the line or mains 10, and with the switches 20 and 22 closed, A.C. is supplied to the output windings or secondaries 38 and 40 of the transformer 16. Positive potential is applied through the line 26 to the terminal block by way of the switch 22, and the line 70 from the positive side of the battery 48. The negative side of the battery is not connected under such conditions to the terminal block. However, it will be seen that there is a path from the negative side of the battery through the wire 46 and the wire 44 to the secondary winding 40, and from there through the wire 170 to the junction 168. The junction is connected to the solid state switch or controlled rectifier 176, as previously noted, but this is not conducting; hence the negative side of the battery potential is open to the line 180. The switch or rectifier 176 is turned on upon failure of the A.C. supply, as will be mentioned hereinafter.

When the battery 48 is charged, or nearly so, it receives a trickle charge through the diode 58 from the 4-way rectifier including the diodes 52 and 54.

At this time there is a positive potential on the line 56, and a current path exists through the resistor 84 to the resistor 90, and hence through the resistors 96 and 108 to the negative line 88 and back through the negative line 90 to the center tap 42 of the transformer secondary 38. Thus, there is a potential drop across the resistor 84, and the green trickle charge lamp 80 is on. Also, the capacitor 86 charges up.

As long as the A.C. power is on, the transistor 148 will not be on or conducting. The Zener diode 158 bucks the battery as long as the A.C. power is on, and the diode 162 provides a bias to hold the transistor 148 nonconducting. In this connection, it should be borne in mind that there is an A.C. circuit from the secondary 40 including the capacitor 172 and diode 162. Once the A.C. supply fails, this bucking potential no longer pertains, and the transistor 148 conducts. When it does so conduct, it changes the bias on the gate 182 of the solid state switch or controlled rectifier 176, thereby turning this controlled rectifier on. This provides a negative return path from the terminal block 28 through the wire 180, the controlled rectifier 176, junction 168, wire 170, secondary winding 40 and wire 44 to the wire 46, and to the negative side of the battery 48. Thus, the lamps 34 are illuminated. The diode 117 keeps the capacitor 124 discharged when the A.C. is off. In due course, the A.C. normally comes back on, and the biasing of the transistor 148 reverts to that mentioned previously, thereby shutting off this transistor, and in turn shutting off the solid state switch or controlled rectifier 176, thereby extinguishing the emergency lamps 34.

It is to be anticipated that the battery 48 would have been partially discharged while the emergency lamps 34 have been energized. The output voltage of the battery 48 will appear across the voltage divider circuit comprising resistors 116, 118 and 122. The potential as picked off by the tap 120 and applied to the Zener diode 126 will, under these conditions, be insufficient to fire the controlled rectifier 136. The biasing of the transistor 100 under such partially discharged conditions is such that the transistor conducts, and the diode 94 conducts to turn on the controlled rectifier 72, and thus to charge the battery at a high rate. When the battery comes up to its fully charged voltage of 7.2 volts, or nearly so, the voltage through the Zener diode 126 is sufficient to turn on the controlled rectifier 136. When this happens, the biasing changes, so that the diode 94 is substantially at ground potential, as is the gate 78, whereby the solid state switch or controlled rectifier 72 is turned off and clamped off. Also, the transistor 100 is turned off, and the red indicating light, which was on during the high rate of charge, is turned off. As will be appreciated, the tap 120 permits setting the point at which the high charge rate is switched and this compensates for individual differences in components.

The capacitors 124 and 130 and associated resistors act as a time delay network of a second or two, so that the battery voltage, which tends to rise to 7.2 volts immediately upon turning on of the high rate charge, does not act to turn off the high rate charge, but allows time for stabilization with the battery at some lower voltage until such time as the battery reaches its full charge.

Thus, there has been described, an emergency or standby D.C. lighting system, in which the D.C. lamps are normally held off or extinguished by means of a solid state switch or controlled rectifier which does not consume any wasteful power in the off condition. This switch or rectifier is turned on through a transistor controlled by a Zener diode, hence providing critical, solid state control of the controlled rectifier.

Similarly, the charging of the battery is at two rates, a trickle charge, and a high rate, the latter being controlled by a solid state switch or controlled rectifier, which in turn is under the control of a diode for turning on, and further under the control of an auxiliary solid state switch or controlled rectifier and a Zener diode for turning it off and holding it off. A transistor in the latter circuit also controls the lighting of a red lamp to indicate when the high rate charge is in effect.

The specific example of the invention as herein shown and described is for illustrative purposes only. Various changes in structure will no doubt occur to those skilled in the art, and will be understood as forming a part of the present invention insofar as they fall within the spirit and scope of the appended claims.

The invention is claimed as follows:

1. A D.C. emergency lighting system comprising an A.C. input circuit, a D.C. output circuit, a storage battery, means including a controlled rectifier connecting said battery and said D.C. output circuit, means interconnected with said controlled rectifier and said A.C. input circuit and holding said controlled rectifier in non-conducting condition and said D.C. output circuit thereby isolated from said battery as long as A.C. potential is on said A.C. input circuit, said holding means including a Zener diode, and means including a rectifier connecting said A.C. input means and said battery for charging said battery.

2. A system as set forth in claim 1, and further including means connecting said Zener diode to said A.C. input circuit and to said battery whereby said Zener diode bucks said battery as long as A.C. potential is on said A.C. input circuit and thus to hold said controlled rectifier in non-conducting condition.

3. A system as set forth in claim 2, and further including a transistor interconnecting said Zener diode and said controlled rectifier, said Zener diode effecting control of said controlled rectifier through said transistor.

4. A system as set forth in claim 3, and further including a diode interconnecting said Zener diode and said A.C. input circuit.

5. A system as set forth in claim 1, and further including a first A.C. secondary circuit and a second A.C. secondary circuit, both of said A.C. secondary circuits being connected to said A.C. input circuit, said first A.C. secondary circuit being connected to said rectifier and said battery, and said second A.C. secondary circuit being connected to said controlled rectifier and said holding means.

6. A system as set forth in claim 5, wherein said Zener diode is connected to buck said battery as long as A.C. potential appears on said A.C. input means and thus to hold said controlled rectifier in non-conducting condition.

7. A system as set forth in claim 6, and further including a transistor interconnecting said Zener diode and said controlled rectifier, said Zener diode effecting control of said controlled rectifier through said transistor.

8. A system as set forth in claim 7, and further including a diode in said holding means connected in said first A.C. secondary circuit.

9. A system as set forth in claim 1, wherein said rectifier charges said battery at a low rate, and further including a controlled rectifier interconnecting said A.C. input circuit and said battery for charging said battery in parallel with said rectifier at a higher rate, and control means interconnecting said battery and said last mentioned controlled rectifier and dependent on the stage of charge of said battery to render said last mentioned controlled rectifier conductive or non-conductive.

10. A D.C. emergency lighting system comprising an A.C. input circuit, a D.C. output circuit, a storage battery, means including a controlled rectifier connecting said battery and said D.C. output circuit, means interconnected with said controlled rectifier and said A.C. input circuit and holding said controlled rectifier in non-conducting condition as long as A.C. potential is on said A.C. input circuit, and means for charging said battery at a low rate and at a high rate selectively, said battery charging means including a second controlled rectifier, and means interconnecting said second controlled rectifier and said battery and dependent on the stage of charge of said battery to turn said controlled rectifier on or off for a high or low rate of charge respectively.

11. A system as set forth in claim 10 wherein the means interconnecting the battery and the second controlled rectifier includes a voltage divider network and a diode.

12. A system as set forth in claim 10, and further including an indicator for indicating a high rate of charge, and means including a transistor interconnecting said indicator and said controlled rectifier for operating said indicator.

13. A system as set forth in claim 11, and further including a third controlled rectifier and means interconnecting said third controlled rectifier, said battery, and said second controlled rectifier to turn said third controlled rectifier on when said battery reaches a predetermined condition of charge and thereby to turn off and clamp off said second controlled rectifier.

14. A system as set forth in claim 13 wherein the means interconnecting the battery and the third controlled rectifier includes a voltage divider network and a Zener diode.

References Cited

UNITED STATES PATENTS 3,049,623  8/1962  Du Vall.

ROBERT K. SCHAEFER, Primary Examiner

H. J. HOHAUSER, Assistant Examiner